United States Patent
Gu (10) Patent No.: US 12,397,757 B2
(45) Date of Patent: Aug. 26, 2025

(54) BRAKING CONTROL METHOD, VEHICLE, STORAGE MEDIUM AND CHIP

(71) Applicant: Xiaomi EV Technology Co., Ltd., Beijing (CN)

(72) Inventor: Wenhao Gu, Beijing (CN)

(73) Assignee: Xiaomi EV Technology Co., Ltd., Beijing (CN)

( * ) Notice: Subject to any disclaimer, the term of this patent is extended or adjusted under 35 U.S.C. 154(b) by 51 days.

(21) Appl. No.: 18/426,753

(22) Filed: Jan. 30, 2024

(65) Prior Publication Data
US 2024/0317193 A1    Sep. 26, 2024

(30) Foreign Application Priority Data
Mar. 30, 2023 (CN) .......................... 202310335705.8

(51) Int. Cl.
*B60T 8/17*     (2006.01)
*B60T 8/171*    (2006.01)
*B60T 8/88*     (2006.01)

(52) U.S. Cl.
CPC .............. *B60T 8/171* (2013.01); *B60T 8/885* (2013.01); *B60T 2270/413* (2013.01)

(58) Field of Classification Search
CPC . B60T 8/17; B60T 8/171; B60T 8/221; B60T 8/885
See application file for complete search history.

(56) References Cited

U.S. PATENT DOCUMENTS

| | | | |
|---|---|---|---|
| 5,042,884 A * | 8/1991 | Farr ...................... | B60T 8/4241 |
| | | | 303/9.71 |
| 5,173,860 A * | 12/1992 | Walenty .................. | B60T 8/172 |
| | | | 701/75 |
| 9,527,487 B2 | 12/2016 | Joyce et al. | |
| 10,661,764 B1 * | 5/2020 | Katzourakis ............ | B60T 8/172 |
| 2005/0288842 A1 | 12/2005 | Brewer et al. | |
| 2006/0241828 A1 * | 10/2006 | Yasui .................. | B60T 8/17554 |
| | | | 701/1 |
| 2009/0192689 A1 | 7/2009 | Dunn et al. | |
| 2011/0295480 A1 * | 12/2011 | Shimada ............... | B60W 30/02 |
| | | | 701/70 |
| 2018/0148027 A1 | 5/2018 | Fehrenbacher et al. | |
| 2018/0265077 A1 * | 9/2018 | Watanabe ....... | B60W 30/18172 |

(Continued)

FOREIGN PATENT DOCUMENTS

| CN | 108128306 A | 6/2018 |
|---|---|---|
| CN | 114485630 A | 5/2022 |

(Continued)

*Primary Examiner* — Long T Tran
(74) *Attorney, Agent, or Firm* — Volpe Koenig (57) ABSTRACT

A brake control method, which is applied to a vehicle, and includes: determining abnormal conditions of a primary brake unit and a backup brake unit; determining a vehicle control strategy according to the abnormal condition; controlling rear wheels to be in a free-rolling state in the case that the vehicle control strategy corresponds to a first abnormal condition; and performing, by the primary brake unit, braking according to first wheel speed information collected by a first wheel speed sensor and first axle speed information of a rear axle motor, or according to the first wheel speed information, the first axle speed information and second axle speed information of a front axle motor in response to a braking request.

19 Claims, 5 Drawing Sheets

(56) References Cited

U.S. PATENT DOCUMENTS

| | | | |
|---|---|---|---|
| 2021/0122343 A1* | 4/2021 | Mehdizade | B60T 8/171 |
| 2022/0289155 A1* | 9/2022 | Lee | B60T 8/885 |
| 2022/0314953 A1 | 10/2022 | Brok et al. | |
| 2022/0410866 A1* | 12/2022 | Hwang | B60T 8/3255 |
| 2023/0042441 A1* | 2/2023 | Fujita | B60K 23/04 |
| 2024/0101089 A1* | 3/2024 | Kim | B60T 8/96 |

FOREIGN PATENT DOCUMENTS

| | | |
|---|---|---|
| CN | 114852033 A | 8/2022 |
| JP | 2006327242 A | 12/2006 |

\* cited by examiner

BRAKING CONTROL METHOD, VEHICLE, STORAGE MEDIUM AND CHIP

REFERENCE TO RELATED APPLICATIONS

The present application claims the benefit of priority to Chinese Application No. 202310335705.8, filed on Mar. 30, 2023, the contents of which are incorporated herein by reference in their entireties for all purposes.

BACKGROUND OF THE INVENTION

In the related art, in order to ensure the reliability of vehicle braking, the primary brake system is generally connected with four wheel speed sensors, and the backup brake system is connected with two or four wheel speed sensors, so that the vehicle needs to be equipped with six or eight wheel speed sensors. However, this will increase the installation difficulty and cost of the vehicle.

SUMMARY OF THE INVENTION

The disclosure relates to the field of vehicle control, in particular to a brake control method, a vehicle, a storage medium, and a chip.

According to a first aspect of examples of the disclosure, there is provided a brake control method, applied to a vehicle, where the vehicle is a four-wheeled vehicle, and includes a primary brake unit and a backup brake unit, where the primary brake unit is connected with a first wheel speed sensor corresponding to at least one front wheel, and the backup brake unit is connected with a second wheel speed sensor corresponding to each wheel, and the method includes:
  determining an abnormal condition of the primary brake unit and the backup brake unit;
  determining a vehicle control strategy according to the abnormal condition;
  controlling rear wheels to be in a free-rolling state in the case that the vehicle control strategy corresponds to a first abnormal condition, where the first abnormal condition indicates that the primary brake unit is normal and the backup brake unit is abnormal;
  acquiring, by the primary brake unit, first wheel speed information collected by the first wheel speed sensor and first axle speed information of a rear axle motor, or acquiring the first wheel speed information, the first axle speed information and second axle speed information of the front axle motor; and
  performing, by the primary brake unit, braking according to the first wheel speed information and the first axle speed information, or according to the first wheel speed information, the first axle speed information and the second axle speed information, in response to a braking request.

According to a second aspect of the examples of the disclosure, there is provided a vehicle device, including:
  a processor; and
  a memory, configured to store instructions executable by the processor; where
  the processor is configured to:
  determine an abnormal condition of a primary brake unit and a backup brake unit, where the primary brake unit is connected with a first wheel speed sensor corresponding to at least one front wheel;
  determine a vehicle control strategy according to the abnormal condition;
  control rear wheels to be in a free-rolling state in the case that the vehicle control strategy corresponds to a first abnormal condition, where the first abnormal condition indicates that the primary brake unit is normal and the backup brake unit is abnormal;
  acquire, by the primary brake unit, first wheel speed information collected by the first wheel speed sensor and first axle speed information of a rear axle motor, or acquire the first wheel speed information, the first axle speed information and second axle speed information of the front axle motor; and
  perform, by the primary brake unit, braking according to the first wheel speed information and the first axle speed information, or according to the first wheel speed information, the first axle speed information and the second axle speed information, in response to a braking request.

According to a third aspect of the examples of the disclosure, there is provided a computer-readable storage medium storing computer program instructions, where the computer program instructions, when executed by a processor, implement the steps of the method of the first aspect of the disclosure.

According to a fourth aspect of the examples of the disclosure, there is provided a chip, including a processor and an interface; the processor is configured to read instructions to perform the method of the first aspect of the disclosure.

It needs to be understood that the above general description and the following detailed description are merely illustrative and interpretive, and cannot limit the disclosure.

BRIEF DESCRIPTION OF DRAWINGS

The accompanying drawings, which are incorporated in and constitute a part of this description, illustrate examples consistent with the disclosure and together with the description, serve to explain the principles of the disclosure.

DETAILED DESCRIPTION OF THE INVENTION

Reference will now be made in detail to examples, instances of which are illustrated in the accompanying drawings. When the following description involves drawings, the same numbers in different drawings represent the same or similar elements unless otherwise stated. The embodiments described in the following examples do not represent all embodiments consistent with the disclosure. On the contrary, the embodiments are just examples of devices and methods consistent with some aspects of the disclosure as detailed in the attached claims.

With the development of autonomous driving, in L3 driverless scenario, when the primary brake system fails, the vehicle needs a backup brake system to take over and perform the deceleration demand of the vehicle. At the same time, the backup brake system also needs to have braking anti-lock capability according to the relevant requirements. Thus, in the related art, the primary brake system is typically connected with four wheel speed sensors, and the backup brake system is connected with two or four wheel speed sensors, so that the vehicle needs to be equipped with six or eight wheel speed sensors.

Figure 1:
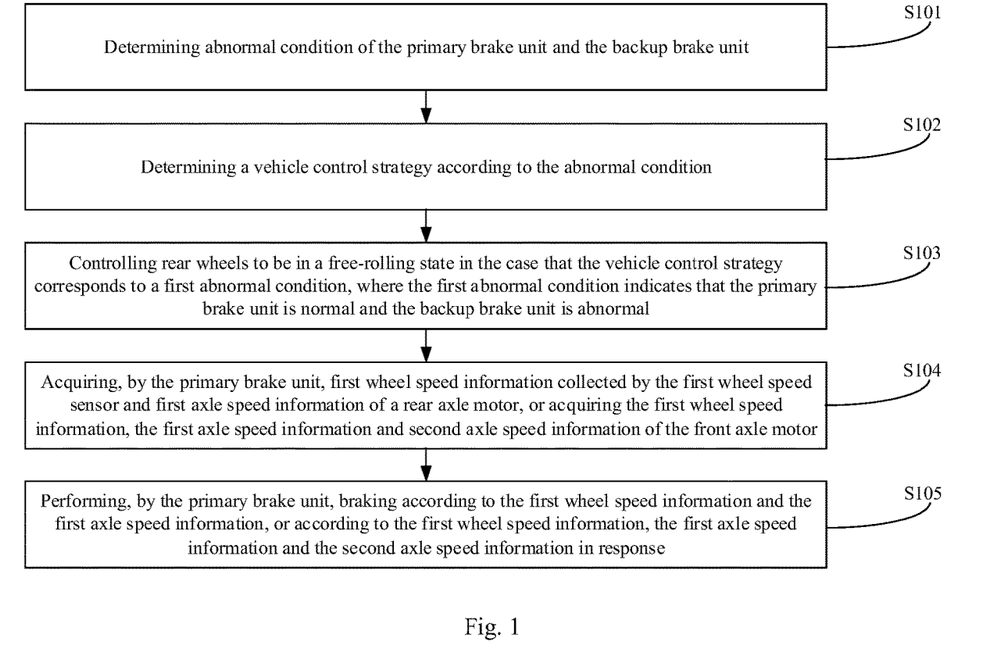
FIG. 1 is a flowchart of a brake control method according to an example.

FIG. 1 is a flowchart of a brake control method according to an example, the method is applied to a vehicle, which is a four-wheeled vehicle, and includes a primary brake unit and a backup brake unit, where the primary brake unit is connected with a first wheel speed sensor corresponding to at least one front wheel, and the backup brake unit is connected with a second wheel speed sensor corresponding to each wheel. The primary brake unit and the backup brake unit may be two electronic control units (ECUs) connected by a CAN bus, and are connected with a central control unit via Ethernet and/or the CAN bus, and control instructions sent by the central control unit are received so as to control a braking mechanism connected with the primary brake unit and the backup brake unit to perform braking, and the central control unit may be, for example, a domain controller of a vehicle, for example, a domain controller of a vehicle intelligent driving domain, which may be a system-on-chip. In an example, the method may be applied specifically to the central control unit.

As shown in FIG. 1, the method includes:

S101, determining abnormal condition of the primary brake unit and the backup brake unit.

The abnormal condition may be used to indicate at least whether the primary brake unit has an abnormality and fails, and whether the backup brake unit has an abnormality and fails. When the primary brake unit fails, the central control unit is unable to acquire wheel speed information collected by the wheel speed sensor connected with the primary brake unit and is unable to control the brake mechanism connected with the primary brake unit.

In some alternative examples, the primary brake unit is an electronic vehicle body stability system that can be used to perform electronic vehicle stability control, i.e., an electronic stability program (ESP), to ensure vehicle body stability during vehicle traveling and braking.

Further, the backup brake unit is an electrically controlled brake boost system, an intelligent decoupled brake system, or a redundant brake unit. The backup brake unit can be used to control the motor of the backup brake unit to push brake fluid into the brake wheel cylinder to generate braking force. The electrically controlled brake boost system may also be referred to as an electric servo booster or IBooster, and the intelligent decoupled brake system may be a decoupling brake system (DPB). It will be appreciated that the electrically controlled brake boost system may be partially decoupled from the brake pedal and the intelligent decoupled brake system may be fully decoupled from the brake pedal. In practical application, those skilled in the art can determine the brake system adopted by the backup brake unit as needed, and the disclosure will not make limitations to this.

S102, determining a vehicle control strategy according to the abnormal condition.

Under different abnormal condition, the brake mechanism that the vehicle can control and used for braking is different, and the wheel speed collected by the wheel speed sensor that can be acquired is also different. Thus, in order to ensure the safety of vehicle control under different abnormal condition, the vehicle control strategy is also different. In some examples, the abnormal condition may include a first abnormal condition, a second abnormal condition, and a normal condition, where the normal condition is a condition in which there is no abnormality in both the primary brake unit and the backup brake unit.

S103, controlling rear wheels to be in a free-rolling state in the case that the vehicle control strategy corresponds to a first abnormal condition, where the first abnormal condition indicates that the primary brake unit is normal and the backup brake unit is abnormal.

Controlling the rear wheels to be in the free-rolling state may specifically include stopping the rear axle motor from outputting torque, and stopping the brake mechanism of the rear wheels from providing braking force, so as to avoid the driving motor or the braking mechanism from affecting the free-rolling state of the rear wheels. It can be understood that since the rear wheels are in a free-rolling state, it can be considered that the axle speed of the rear axle motor is equal to the current reference vehicle speed under most operating conditions, and the wheel speed of the rear wheel can be determined according to the axle speed of the rear axle motor.

S104, acquiring, by the primary brake unit, first wheel speed information collected by the first wheel speed sensor and first axle speed information of a rear axle motor, or acquiring the first wheel speed information, the first axle speed information and second axle speed information of the front axle motor.

In some examples, the primary brake unit may be connected with the first wheel speed sensors corresponding to two front wheels, respectively, and the primary brake unit may not acquire the second axle speed information of the front axle motor. Optionally, when the vehicle is a rear drive vehicle, the primary brake unit may be set to be connected with the first wheel speed sensors respectively corresponding to two front wheels.

In some examples, the primary brake unit may merely be connected with the first wheel speed sensor corresponding to one front wheel, and thus may acquire the first wheel speed information corresponding to the front wheel and the second axle speed information. Optionally, when the vehicle is a four-wheel-drive vehicle, the primary brake unit may be set to be connected with first wheel speed sensors corresponding to two front wheels, respectively.

It needs to be noted that the front axle motor and the rear axle motor may be connected with the primary brake unit and the backup brake unit through an Ethernet or CAN bus, respectively, and the primary brake unit and the backup brake unit may acquire the axle speed information of the front axle motor and the rear axle motor, respectively through this connection.

S105, performing, by the primary brake unit, braking according to the first wheel speed information and the first axle speed information, or according to the first wheel speed information, the first axle speed information and the second axle speed information in response to a braking request.

In some examples, the primary brake unit may be connected with first wheel speed sensors respectively corresponding to two front wheels, thus acquiring wheel speeds of two front wheels based on the first wheel speed sensors respectively corresponding to two front wheels, to achieve reliable braking.

In some examples, the primary brake unit may merely be connected with the first wheel speed sensor corresponding to one front wheel, and the wheel speeds of two front wheels may be determined based on the first wheel speed sensor corresponding to the front wheel and the second axle speed information to perform reliable braking.

In some examples, the braking request is generated in response to a braking operation by a driver, for example, the braking request is sent when a brake pedal is pedaled, or a P button is pressed; alternatively, the braking request is generated in response to triggering vehicle dynamic control, e.g., the vehicle detects the occurrence of an instability and triggers the vehicle dynamic control; alternatively, the braking request is generated in response to triggering vehicle tracking control, e.g., the vehicle detects that a drive wheel slips and triggers the vehicle tracking control; alternatively, the braking request is generated in response to triggering anti-lock control; alternatively, the braking request may also be generated in response to an ADAS (Advanced Driving Assistance System) request.

Since the backup brake unit is abnormal, the vehicle cannot acquire, by the backup brake unit, the wheel speeds collected by the wheel speed sensors connected to the backup brake unit, and can determine the wheel speeds of the wheels based on the wheel speed information collected by the first wheel speed sensor connected with the primary brake unit and the axle speeds of the front axle motor and the rear axle motor to perform braking.

In an example of the disclosure, since at least one wheel speed sensor connected with the primary brake unit is arranged, when it is detected that the primary brake unit is normal and the backup brake unit fails, the rear wheels are controlled to freely roll, the wheel speeds of the front wheels and axle speeds of the front axle motor and the rear axle motor may in turn be detected by the wheel speed sensor connected with the primary brake unit, and wheel speed information of the wheels can be accurately determined merely by additionally arranging at least one wheel speed sensor at the front wheel, thus achieving more accurate braking control, ensuring the safety performance of vehicle braking, and effectively reducing the cost of the vehicle.

In some alternative examples, performing, by the primary brake unit, braking according to the first wheel speed information and the first axle speed information, or according to the first wheel speed information, the first axle speed information and the second axle speed information, in response to the braking request includes:
  determining, by the primary brake unit, a reference vehicle speed of the vehicle according to the first axle speed information of the rear axle motor;
  determining wheel speed information of two front wheels according to the first wheel speed information and the second axle speed information of the front axle motor in the case that the primary brake unit is connected with a first wheel speed sensor corresponding to one front wheel;
  determining wheel speed information of two front wheels according to the first wheel speed information in the case that the primary brake unit is connected with first wheel speed sensors respectively corresponding to two front wheels;
  determining a front wheel slip ratio according to the wheel speed information of two front wheels and the reference vehicle speed of the vehicle; and
  performing braking according to the front wheel slip ratio.

For example, in the case that the primary brake unit is connected with the first wheel speed sensor corresponding to one front wheel, if the wheel speed corresponding to the first wheel speed information acquired by the primary brake unit is X and the axle speed of the front axle motor is Y, the wheel speed of the other front wheel can be calculated by the following formula: $Y=(X+Z)/2$, where Z is the wheel speed of the other front wheel.

Further, in some examples, it is also possible to determine respective wheel speeds of the two rear wheels based on the axle speed of the rear axle motor, and determine rear wheels slip ratio, thus braking the four wheels based on the front wheel slip ratio and the rear wheel slip ratio.

By adopting the above solution, when the backup brake unit fails, the reference vehicle speed of the vehicle can be determined according to the axle speed of the rear axle motor, and the wheel speed of the front wheel not provided with a wheel speed sensor can be accurately determined according to the axle speed of the front axle motor and the first wheel speed information, so as to perform reliable braking and effectively ensure the safety performance of vehicle braking.

In some alternative examples, the method further includes:
  acquiring, by the primary brake unit, second wheel speed information collected by the second wheel speed sensors connected with the backup brake unit from a CAN bus in the case that the vehicle control strategy corresponds to a normal condition; and
  performing, by the primary brake unit, braking according to the second wheel speed information in response to a braking request; where
  the normal condition indicates that the primary brake unit is normal and the backup brake unit is also normal.

It will be appreciated that when the backup brake unit is normal, the primary brake unit may obtain the wheel speed information collected by the wheel speed sensors connected with the backup brake unit and corresponding to the wheels via the CAN bus, thus directly obtaining the wheel speeds of the wheels.

By adopting the solution, when the primary brake unit and the backup brake unit are both normal, the wheel speed information of the wheels collected by the backup brake unit from the wheel speed sensors is acquired by the primary brake unit through the CAN bus, so that braking can be carried out based on the wheel speed information of the wheels, and the wheel speeds of the wheels can be obtained without calculating the wheel speed information collected by the first wheel speed sensor connected with the primary brake unit, thus effectively improving the efficiency of information processing and ensuring the safety performance of vehicle braking.

In some alternative examples, the method further includes:
  braking, by the backup brake unit, the vehicle according to the second wheel speed information collected by the second wheel speed sensors in response to a braking request in the case that the vehicle control strategy corresponds to a second abnormal condition; where
  the second abnormal condition indicates that the primary brake unit is abnormal and the backup brake unit is normal.

By adopting the solution, in the case that the primary brake unit is abnormal, the vehicle can directly obtain the wheel speed information collected by the second wheel speed sensors through the backup brake unit, thus braking the vehicle and effectively ensuring the safety performance of the vehicle.

Figure 2:
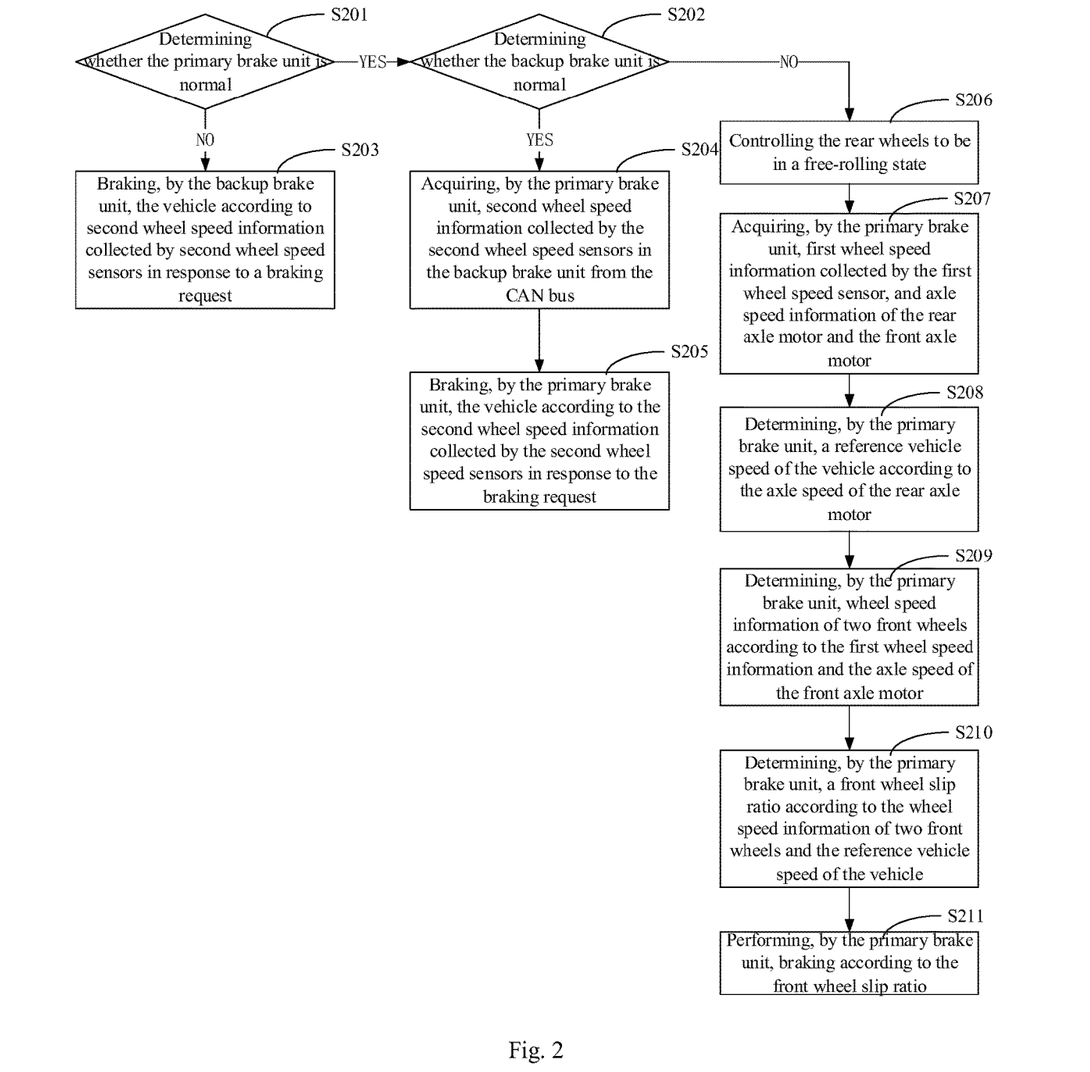
FIG. 2 is another flowchart of a brake control method according to an example.

In order to make those skilled in the art better understand the overall technical solution provided by the disclosure, FIG. 2 is another flowchart of a brake control method according to an example, where in this example, a primary brake unit is connected with a first wheel speed sensor corresponding to one front wheel, and in some examples, the vehicle in which the primary brake unit is deployed is a four drive vehicle, as shown in FIG. 2, the method includes:

S201, determining whether the primary brake unit is normal.

In the case that the primary brake unit is not normal, step S203 is executed; otherwise, step S202 is performed.

S202, determining whether the backup brake unit is normal.

In the case that the backup brake unit is normal, steps S204 to S205 are executed; otherwise, steps S206 to S211 are performed.

S203, braking, by the backup brake unit, the vehicle according to second wheel speed information collected by second wheel speed sensors in response to a braking request.

Specifically, the vehicle can be braked by determining the vehicle reference speed of the vehicle and a four-wheel slip rate based on the second wheel speed information.

S204, acquiring, by the primary brake unit, second wheel speed information collected by the second wheel speed sensors in the backup brake unit from the CAN bus.

S205, braking, by the primary brake unit, the vehicle according to the second wheel speed information collected by the second wheel speed sensors in response to the braking request.

Specifically, the vehicle can be braked by determining the vehicle reference speed of the vehicle and a four-wheel slip rate based on the second wheel speed information.

S206, controlling the rear wheels to be in a free-rolling state.

Step S206 may be, for example, controlled by a domain controller of an intelligent driving domain of the vehicle, and the disclosure will not make limitations to this.

S207, acquiring, by the primary brake unit, first wheel speed information collected by the first wheel speed sensor, and axle speed information of the rear axle motor and the front axle motor.

S208, determining, by the primary brake unit, a reference vehicle speed of the vehicle according to the axle speed of the rear axle motor.

S209, determining, by the primary brake unit, wheel speed information of two front wheels according to the first wheel speed information and the axle speed of the front axle motor.

In some examples, the primary brake unit may be further connected with first wheel speed sensors respectively corresponding to two front wheels, and the step S207 may acquire merely the axle speed information of the rear axle motor and the first wheel speed information collected by the first wheel speed sensors respectively corresponding to two front wheels. The wheel speeds of two front wheels may then be determined at step S209 based on the first wheel speed information.

S210, determining, by the primary brake unit, a front wheel slip ratio according to the wheel speed information of two front wheels and the reference vehicle speed of the vehicle.

S211, performing, by the primary brake unit, braking according to the front wheel slip ratio.

Figure 3:
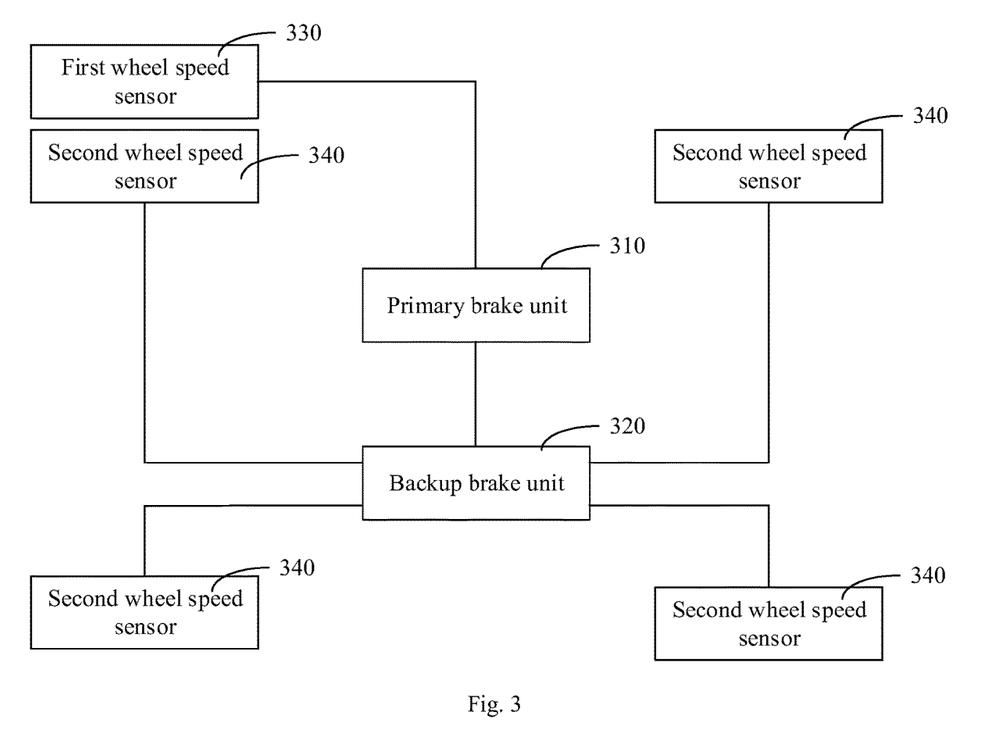
FIG. 3 is a schematic diagram of a brake control system according to an example.

Based on an overall inventive concept, FIG. 3 is a schematic diagram of a brake control system according to an example, the brake control system is arranged in a vehicle, the vehicle is a four-wheeled vehicle, as shown in FIG. 3, the brake control system includes a primary brake unit 310 and a backup brake unit 320, a first wheel speed sensor 330 corresponding to at least one front wheel and a second wheel speed sensor 340 corresponding to each wheel, the primary brake unit 310 is connected with the first wheel speed sensor 330, the backup brake unit 320 is connected with the second wheel speed sensors 340, and then, the vehicle may implement the steps involved in the above-described method example via the primary brake unit 310 or the backup brake unit 320 based on the wheel speed collected by the first wheel speed sensor 330 or the wheel speeds collected by the second wheel speed sensors 340 to achieve vehicle braking control so as to ensure reliable braking under different abnormal condition.

In some examples, the primary brake unit 310 and the backup brake unit 320 may each be connected with and control a front axle motor and a rear axle motor, and acquire axle speeds of the front axle motor and the rear axle motor.

In some examples, the primary brake unit 310 is also connected with a wheel-side brake unit corresponding to each wheel, and the wheel-side brake unit may perform braking by controlling a brake motor.

Figure 4:
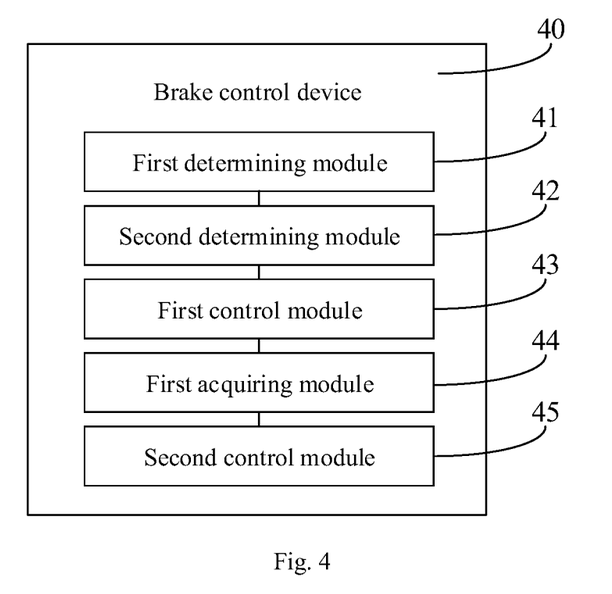
FIG. 4 is a block diagram of a brake control device according to an example.

FIG. 4 is a block diagram of a brake control device according to an example, the brake control device 40 may be applied to a vehicle, the vehicle is a four-wheeled vehicle and includes a primary brake unit and a backup brake unit, where the primary brake unit is connected with a first wheel speed sensor corresponding to at least one front wheel, and the backup brake unit is connected with a second wheel speed sensor corresponding to each wheel, and the brake control device 40 includes:

- a first determining module 41, configured to determine abnormal condition of the primary brake unit and the backup brake unit;
- a second determining module 42, configured to determine a vehicle control strategy according to the abnormal condition;
- a first control module 43, configured to control rear wheels to be in a free-rolling state in the case that the vehicle control strategy corresponds to a first abnormal condition, where the first abnormal condition indicates that the primary brake unit is normal and the backup brake unit is abnormal;
- a first acquiring module 44, configured to acquire, by the primary brake unit, first wheel speed information collected by the first wheel speed sensor and first axle speed information of a rear axle motor, or acquire the first wheel speed information, the first axle speed information and second axle speed information of the front axle motor; and
- a second control module 45, configured to perform, by the primary brake unit, braking according to the first wheel speed information and the first axle speed information, or according to the first wheel speed information, the first axle speed information and the second axle speed information, in response to a braking request.

Optionally, the second control module 45 is configured to:

- determine, by the primary brake unit, a reference vehicle speed of the vehicle according to the first axle speed information of the rear axle motor;
- determine wheel speed information of two front wheels according to the first wheel speed information and the second axle speed information of the front axle motor in the case that the primary brake unit is connected with the first wheel speed sensor corresponding to one front wheel;
- determine wheel speed information of two front wheels according to the first wheel speed information in the case that the primary brake unit is connected with the first wheel speed sensors respectively corresponding to two front wheels;

determine a front wheel slip ratio according to the wheel speed information of two front wheels and the reference vehicle speed of the vehicle; and perform braking according to the front wheel slip ratio.

Optionally, the brake control device 40 further includes:

a second acquiring module, configured to acquire, by the primary brake unit, second wheel speed information collected by the second wheel speed sensors in the backup brake unit from the CAN bus in the case that the vehicle control strategy corresponds to a normal condition; and a third control module, configured to perform, by the primary brake unit, braking according to the second wheel speed information in response to a braking request; where the normal condition indicates that the primary brake unit is normal and the backup brake unit is also normal.

Optionally, the brake control device 40 further includes:

a fourth control module, configured to brake, by the backup brake unit, the vehicle according to the second wheel speed information collected by the second wheel speed sensors in response to a braking request in the case that the vehicle control strategy corresponds to a second abnormal condition; where the second abnormal condition indicates that the primary brake unit is abnormal and the backup brake unit is normal.

Optionally, the braking request is generated in response to a braking operation by a driver; alternatively, the braking request is generated in response to triggering vehicle dynamic control; alternatively, the braking request is generated in response to triggering vehicle tracking control; alternatively, the braking request is generated in response to triggering anti-lock control; alternatively, the braking request is generated in response to an ADAS request.

Optionally, the primary brake unit is an electronic vehicle body stability system, and the backup brake unit is an electrically controlled brake boost system, an intelligent decoupled brake system, or a redundant brake unit.

With regard to the brake control device 40 in the above example, the specific way in which each module performs the operation has been described in detail in the example related to this method, and will not be described in detail here.

In addition to being a separate electronic device, the brake control device 40 may be a part of a separate electronic device. For example, in one example, the brake control device 40 may be an integrated circuit (IC) or a chip, where the IC may be one IC or a set of multiple ICs; the chip may include, but is not limited to, the following categories: GPU (Graphics Processing Unit), CPU (Central Processing Unit), FPGA (Field Programmable Gate Array), DSP (Digital Signal Processor), ASIC (Application Specific Integrated Circuit), SOC (System on Chip or System on Chip), etc. The integrated circuit or chip described above may be used to execute executable instructions (or code) to implement the brake control method described above. The executable instructions may be stored in the integrated circuit or chip, or obtained from other apparatuses or devices. For example, the integrated circuit or chip includes a processor, a memory, and an interface for communicating with other devices. The executable instructions may be stored in the memory, and implement the brake control method described above when executed by the processor; alternatively, the integrated circuit or chip may receive executable instructions through the interface and transmit the executable instructions to the processor for execution to implement the brake control method described above.

The disclosure also provides a computer-readable storage medium storing computer program instructions, where the program instructions, when executed by a processor, implement the steps of the brake control method provided by the disclosure.

Figure 5:
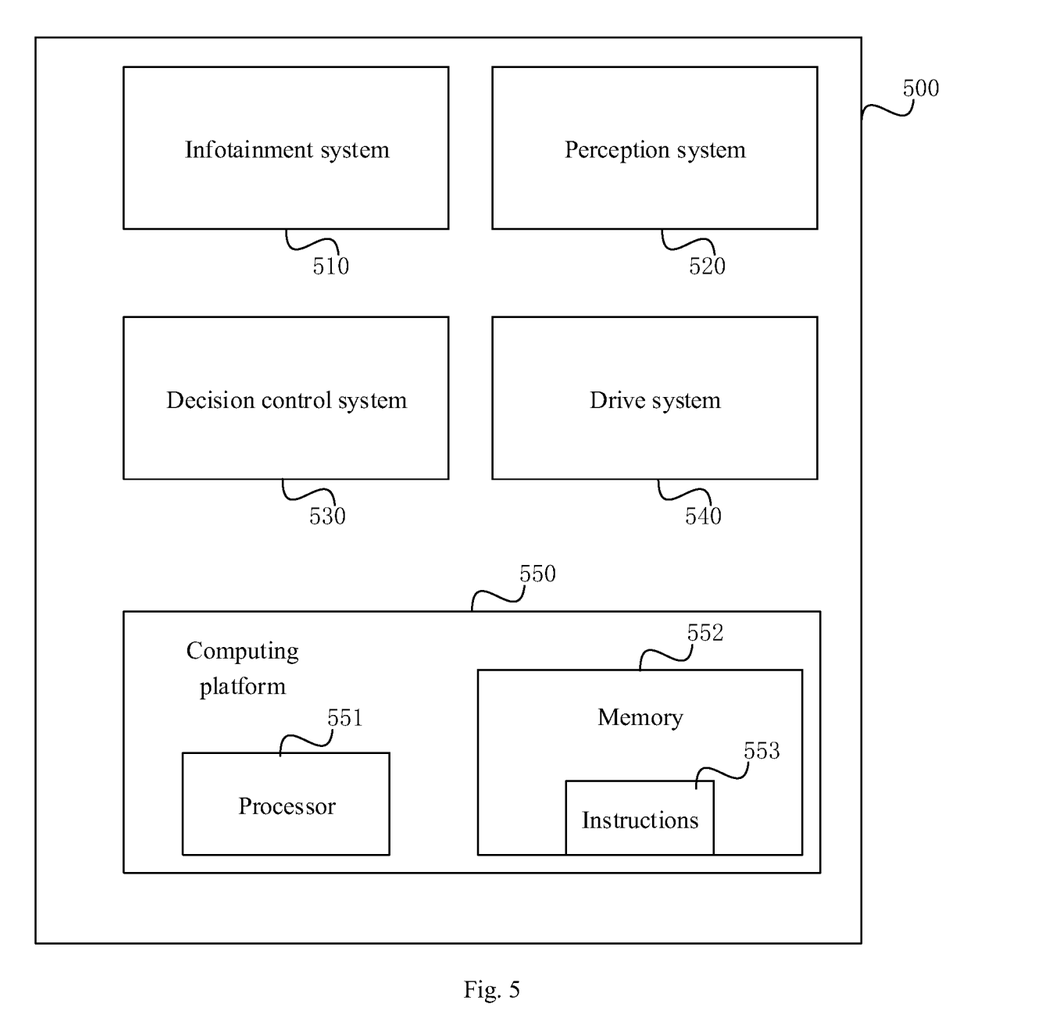
FIG. 5 is a schematic functional block diagram of a vehicle according to an example.

FIG. 5 is a block diagram of a vehicle 500 according to an example. For example, the vehicle 500 may be a hybrid vehicle or a non-hybrid vehicle, an electric vehicle, a fuel cell vehicle, or another type of vehicle. The vehicle 500 may be an autonomous vehicle, a semi-autonomous vehicle, or a non-autonomous vehicle.

Referring to FIG. 5, the vehicle 500 may include various subsystems, such as an infotainment system 510, a perception system 520, a decision control system 530, a drive system 540, and a computing platform 550. The vehicle 500 may also include more or fewer subsystems, and each subsystem may include multiple components. In addition, interconnections between subsystems and between components of the vehicle 500 may be implemented by wired or wireless means.

In some examples, the infotainment system 510 may include a communication system, an entertainment system, a navigation system, and the like.

The perception system 520 may include several sensors for sensing information of the environment surrounding the vehicle 500. For example, the perception system 520 may include a global positioning system (which may be a GPS system or a Beidou system or other positioning system), an inertial measurement unit (IMU), a lidar, a millimeter wave radar, an ultrasonic radar, and a camera.

The decision control system 530 may include a computing system, the vehicle controller, a steering system, a throttle, and a braking system.

The drive system 540 may include components that provide powered motion for the vehicle 500. In one example, the drive system 540 may include an engine, an energy source, a transmission system, and wheels. The engine may be one or a combination of more of an internal combustion engine, an electric motor and an air compression engine. The engine is capable of converting energy provided by the energy source into mechanical energy.

Some or all of the functions of the vehicle 500 are controlled by the computing platform 550. The computing platform 550 may include at least one processor 551 and a memory 552, where the processor 551 may execute instructions 553 stored in the memory 552.

The processor 551 may be any conventional processor, such as a commercially available CPU. The processor may also include, for example, a Graphic Process Unit (GPU), a Field Programmable Gate Array (FPGA), a System on Chip (SOC), an Application Specific Integrated Chip (ASIC), or a combination of the above.

The memory 552 may be implemented by any type or combination of volatile or non-volatile memory devices, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

In addition to the instructions 553, the memory 552 may also store data, such as road maps, route information, and data of the vehicle, such as location, direction and speed. Data stored by the memory 552 may be used by the computing platform 550.

In an example of the disclosure, the processor 551 may execute the instructions 553 to perform all or part of the above-described brake control method.

In another example, there is also provided a computer program product including a computer program executable by a programmable device, and the computer program has a code portion for performing the brake control method when executed by the programmable device.

Those skilled in the art may readily conceive other examples of the disclosure after taking into account the description and practicing the disclosure. The application aims to cover any variation, use or adaptive change of the disclosure, and these variations, uses or adaptive changes follow the general principles of the disclosure and include the known common knowledge or customary technical means in the art, which is not disclosed by the disclosure. The description and examples are considered as merely exemplary, and the true scope and spirit of the disclosure are indicated by the following claims.

It needs to be understood that the disclosure is not limited to the precise structures that have been described above and shown in the drawings, and that various modifications and changes may be made without departing from the scope of the disclosure. The scope of the disclosure is limited merely by the appended claims.

The invention claimed is:

1. A brake control method, applied to a vehicle, wherein the vehicle is a four-wheeled vehicle, and comprises a primary brake unit and a backup brake unit, wherein the primary brake unit is connected with a first wheel speed sensor corresponding to at least one front wheel, and the backup brake unit is connected with a second wheel speed sensor corresponding to each wheel, and the method comprises:
   determining an abnormal condition of the primary brake unit and the backup brake unit;
   determining a vehicle control strategy according to the abnormal condition;
   controlling rear wheels to be in a free-rolling state in the case that the vehicle control strategy corresponds to a first abnormal condition, wherein the first abnormal condition indicates that the primary brake unit is normal and the backup brake unit is abnormal;
   acquiring, by the primary brake unit, first wheel speed information collected by the first wheel speed sensor and first axle speed information of a rear axle motor, or acquiring the first wheel speed information, the first axle speed information and second axle speed information of a front axle motor; and
   performing, by the primary brake unit, braking according to the first wheel speed information and the first axle speed information, or according to the first wheel speed information, the first axle speed information and the second axle speed information, in response to a braking request.

2. The method according to claim 1, wherein performing, by the primary brake unit, braking according to the first wheel speed information and the first axle speed information, or according to the first wheel speed information, the first axle speed information and the second axle speed information, in response to the braking request comprises:
   determining, by the primary brake unit, a reference vehicle speed of the vehicle according to the first axle speed information of the rear axle motor;
   determining wheel speed information of two front wheels according to the first wheel speed information and the second axle speed information of the front axle motor in the case that the primary brake unit is connected with the first wheel speed sensor corresponding to one front wheel;
   determining wheel speed information of two front wheels according to the first wheel speed information in the case that the primary brake unit is connected with the first wheel speed sensors respectively corresponding to two front wheels;
   determining a front wheel slip ratio according to the wheel speed information of two front wheels and the reference vehicle speed of the vehicle; and
   performing braking according to the front wheel slip ratio.

3. The method according to claim 1, further comprising:
   acquiring, by the primary brake unit, second wheel speed information collected by the second wheel speed sensors connected with the backup brake unit from a CAN bus in the case that the vehicle control strategy corresponds to a normal condition; and
   performing, by the primary brake unit, braking according to the second wheel speed information in response to the braking request; wherein
   the normal condition indicates that the primary brake unit is normal and the backup brake unit is also normal.

4. The method according to claim 1, further comprising:
   performing braking, by the backup brake unit, according to second wheel speed information collected by the second wheel speed sensors in response to the braking request in the case that the vehicle control strategy corresponds to a second abnormal condition; wherein
   the second abnormal condition indicates that the primary brake unit is abnormal and the backup brake unit is normal.

5. The method according to claim 1, wherein the braking request is generated in response to a braking operation by a driver; or, the braking request is generated in response to triggering vehicle dynamic control; or, the braking request is generated in response to triggering vehicle tracking control; or, the braking request is generated in response to triggering anti-lock control; or, the braking request is generated in response to an ADAS request.

6. The method according to claim 1, wherein the primary brake unit is an electronic vehicle body stability system, and the backup brake unit is an electrically controlled brake boost system or an intelligent decoupled brake system or a redundant brake unit.

7. A chip, comprising a processor and an interface; wherein the processor is configured to read instructions to perform the method according to claim 1.

8. A vehicle, comprising:
   a processor; and
   a memory, configured to store instructions executable by the processor; wherein
   the processor is configured to:
   determine an abnormal condition of a primary brake unit and a backup brake unit, wherein the primary brake unit is connected with a first wheel speed sensor corresponding to at least one front wheel;
   determine a vehicle control strategy according to the abnormal condition;
   control rear wheels to be in a free-rolling state in the case that the vehicle control strategy corresponds to a first abnormal condition, wherein the first abnormal condition indicates that the primary brake unit is normal and the backup brake unit is abnormal;

acquire, by the primary brake unit, first wheel speed information collected by the first wheel speed sensor and first axle speed information of a rear axle motor, or acquire the first wheel speed information, the first axle speed information and second axle speed information of a front axle motor; and perform, by the primary brake unit, braking according to the first wheel speed information and the first axle speed information, or according to the first wheel speed information, the first axle speed information and the second axle speed information, in response to a braking request.

9. The vehicle according to claim 8, wherein perform, by the primary brake unit, braking according to the first wheel speed information and the first axle speed information, or according to the first wheel speed information, the first axle speed information and the second axle speed information, in response to the braking request comprises:

determine, by the primary brake unit, a reference vehicle speed of the vehicle according to the first axle speed information of the rear axle motor;

determine wheel speed information of two front wheels according to the first wheel speed information and the second axle speed information of the front axle motor in the case that the primary brake unit is connected with the first wheel speed sensor corresponding to one front wheel;

determine wheel speed information of two front wheels according to the first wheel speed information in the case that the primary brake unit is connected with the first wheel speed sensors respectively corresponding to two front wheels;

determine a front wheel slip ratio according to the wheel speed information of two front wheels and the reference vehicle speed of the vehicle; and perform braking according to the front wheel slip ratio.

10. The vehicle according to claim 8, the processor is further configured to:

acquire, by the primary brake unit, second wheel speed information collected by the second wheel speed sensors connected with the backup brake unit from a CAN bus in the case that the vehicle control strategy corresponds to a normal condition; and perform, by the primary brake unit, braking according to the second wheel speed information in response to the braking request; wherein the normal condition indicates that the primary brake unit is normal and the backup brake unit is also normal.

11. The vehicle according to claim 8, the processor is further configured to:

perform braking, by the backup brake unit, according to second wheel speed information collected by the second wheel speed sensors in response to the braking request in the case that the vehicle control strategy corresponds to a second abnormal condition; wherein the second abnormal condition indicates that the primary brake unit is abnormal and the backup brake unit is normal.

12. The vehicle according to claim 8, wherein the braking request is generated in response to a braking operation by a driver; or, the braking request is generated in response to triggering vehicle dynamic control; or, the braking request is generated in response to triggering vehicle tracking control; or, the braking request is generated in response to triggering anti-lock control; or, the braking request is generated in response to an ADAS request.

13. The vehicle according to claim 8, wherein the primary brake unit is an electronic vehicle body stability system, and the backup brake unit is an electrically controlled brake boost system or an intelligent decoupled brake system or a redundant brake unit.

14. A non-transitory computer-readable storage medium, storing computer program instructions, wherein the program instructions when executed by a processor cause the processor to execute a method comprising:

determining an abnormal condition of a primary brake unit and a backup brake unit;

determining a vehicle control strategy according to the abnormal condition;

controlling rear wheels to be in a free-rolling state in the case that the vehicle control strategy corresponds to a first abnormal condition, wherein the first abnormal condition indicates that the primary brake unit is normal and the backup brake unit is abnormal;

acquiring, by the primary brake unit, first wheel speed information collected by the first wheel speed sensor and first axle speed information of a rear axle motor, or acquiring the first wheel speed information, the first axle speed information and second axle speed information of a front axle motor; and performing, by the primary brake unit, braking according to the first wheel speed information and the first axle speed information, or according to the first wheel speed information, the first axle speed information and the second axle speed information, in response to a braking request.

15. The storage medium according to claim 14, wherein performing, by the primary brake unit, braking according to the first wheel speed information and the first axle speed information, or according to the first wheel speed information, the first axle speed information and the second axle speed information, in response to the braking request comprises:

determining, by the primary brake unit, a reference vehicle speed of the vehicle according to the first axle speed information of the rear axle motor;

determining wheel speed information of two front wheels according to the first wheel speed information and the second axle speed information of the front axle motor in the case that the primary brake unit is connected with the first wheel speed sensor corresponding to one front wheel;

determining wheel speed information of two front wheels according to the first wheel speed information in the case that the primary brake unit is connected with the first wheel speed sensors respectively corresponding to two front wheels;

determining a front wheel slip ratio according to the wheel speed information of two front wheels and the reference vehicle speed of the vehicle; and performing braking according to the front wheel slip ratio.

16. The storage medium according to claim 14, wherein the processor is further configured to:

acquiring, by the primary brake unit, second wheel speed information collected by the second wheel speed sensors connected with the backup brake unit from a CAN bus in the case that the vehicle control strategy corresponds to a normal condition; and performing, by the primary brake unit, braking according to the second wheel speed information in response to the braking request; wherein the normal condition indicates that the primary brake unit is normal and the backup brake unit is also normal.

17. The storage medium according to claim 14, wherein the processor is further configured to:
- performing braking, by the backup brake unit, according to second wheel speed information collected by the second wheel speed sensors in response to the braking request in the case that the vehicle control strategy corresponds to a second abnormal condition; wherein
- the second abnormal condition indicates that the primary brake unit is abnormal and the backup brake unit is normal.

18. The storage medium according to claim 14, wherein the braking request is generated in response to a braking operation by a driver; or, the braking request is generated in response to triggering vehicle dynamic control; or, the braking request is generated in response to triggering vehicle tracking control; or, the braking request is generated in response to triggering anti-lock control; or, the braking request is generated in response to an ADAS request.

19. The storage medium according to claim 14, wherein the primary brake unit is an electronic vehicle body stability system, and the backup brake unit is an electrically controlled brake boost system or an intelligent decoupled brake system or a redundant brake unit.

* * * * *

UNITED STATES PATENT AND TRADEMARK OFFICE
CERTIFICATE OF CORRECTION

PATENT NO. : 12,397,757 B2  
APPLICATION NO. : 18/426753  
DATED : August 26, 2025  
INVENTOR(S) : Wenhao Gu Page 1 of 1

It is certified that error appears in the above-identified patent and that said Letters Patent is hereby corrected as shown below:

In the Drawings

In Fig. 1, Sheet 1 of 5, for Tag "S105", in Line 3, delete "response" and insert -- response to a braking request --, therefor.

In the Specification

In Column 3, Line 61, delete "used" and insert -- use --, therefor.
In Column 10, Line 33, delete "Beidou" and insert -- BeiDou --, therefor.
In Column 10, Line 54, delete "Process" and insert -- Processing --, therefor.
In Column 10, Line 56, delete "Chip" and insert -- Circuit --, therefor.

Signed and Sealed this  
Twentieth Day of January, 2026

John A. Squires  
*Director of the United States Patent and Trademark Office*